(12) United States Patent
Marshall

(10) Patent No.: US 6,386,606 B1
(45) Date of Patent: May 14, 2002

(54) FRAME FOR CATCHING PET WASTE

(76) Inventor: Alma Marshall, 2508 Adriatic Ave., Long Beach, CA (US) 90810

( * ) Notice: Subject to any disclaimer, the term of this patent is extended or adjusted under 35 U.S.C. 154(b) by 0 days.

(21) Appl. No.: 09/747,877

(22) Filed: Dec. 26, 2000

(51) Int. Cl.[7] .......................... A01K 29/00; B65B 67/04
(52) U.S. Cl. ..................... 294/1.5; 294/1.1; 294/1.4; 15/257.4; 248/101
(58) Field of Search ................... 294/1.1, 1.3, 1.4, 294/1.5, 19.1; 15/104.8, 257.1, 257.4, 257.6, 257.7; 119/802, 804, 805; 248/97, 100, 95, 99, 101

(56) References Cited

U.S. PATENT DOCUMENTS

| | | | | |
|---|---|---|---|---|
| 3,711,141 A | * | 1/1973 | Soergel | 294/1.4 |
| 3,733,099 A | * | 5/1973 | Szita | 294/1.4 |
| 3,866,872 A | * | 2/1975 | Burgess | 248/101 |
| 3,916,962 A | * | 11/1975 | Stolt | 294/1.3 |
| 3,942,832 A | * | 3/1976 | Haas, Jr. | 294/1.3 |
| 3,977,422 A | * | 8/1976 | Cabuluna | 294/1.4 |
| 3,998,415 A | * | 12/1976 | D'Antonio et al. | 248/101 |
| 4,010,970 A | * | 3/1977 | Campbell | 294/1.5 |
| 4,335,678 A | * | 6/1982 | Garza et al. | 294/1.5 |
| 4,705,310 A | * | 11/1987 | Scripter | 294/1.4 |
| 4,852,924 A | * | 8/1989 | Ines | 294/1.5 |
| 5,131,704 A | * | 7/1992 | Li | 294/1.4 |
| 5,562,319 A | * | 10/1996 | Kohler | 294/1.4 |
| 5,676,411 A | * | 10/1997 | Kwok | 294/1.5 |
| D417,320 S | * | 11/1999 | Nunez | D30/162 |
| 5,997,061 A | * | 12/1999 | Langley | 294/1.1 |
| 6,039,370 A | * | 3/2000 | Dooley, Jr. et al. | 294/1.5 |
| 6,067,942 A | * | 5/2000 | Fernandez | 119/802 |
| 6,176,455 B1 | * | 1/2001 | Ma | 248/101 |
| 6,199,802 B1 | * | 3/2001 | Schebe, Sr. | 248/97 |

* cited by examiner

*Primary Examiner*—Dean J. Kramer
*Assistant Examiner*—Paul T. Chin

(57) ABSTRACT

A frame for catching pet waste for holding a bag for catching pet waste. The frame for catching pet waste includes a first tubular member that is elongate and has a first end and a second end. A second tubular member having a generally circular shape. The second end of the first tubular member is fluidly coupled to the second tubular member. Each of a plurality of clamps comprises an upper jaw and a lower jaw hingedly coupled together. Each of the lower jaws is integrally coupled to the second tubular member. Each of a plurality of biasing members biases each of the upper jaws toward a respective one of the lower jaws.

8 Claims, 3 Drawing Sheets

FRAME FOR CATCHING PET WASTE

BACKGROUND OF THE INVENTION

1. Field of the Invention

The present invention relates to waste catchers and more particularly pertains to a new frame for catching pet waste for holding a bag for catching pet waste.

2. Description of the Prior Art

The use of waste catchers is known in the prior art. More specifically, waste catchers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,010,970; 5,779,290; 5,676,411; 4,852,924; 3,977,422; and Des. 312,898.

While these devices fulfill their respective, particular objectives and requirements, the aforementioned patents do not disclose a new frame for catching pet waste. The inventive device includes a first tubular member that is elongate and has a first end and a second end. A second tubular member having a generally circular shape. The second end of the first tubular member is fluidly coupled to the second tubular member. Each of a plurality of clamps comprises an upper jaw and a lower jaw hingedly coupled together. Each of the lower jaws is integrally coupled to the second tubular member. Each of a plurality of biasing members biases each of the upper jaws toward a respective one of the lower jaws.

In these respects, the frame for catching pet waste according to the present invention substantially departs from the conventional concepts and designs of the prior art, and in so doing provides an apparatus primarily developed for the purpose of holding a bag for catching pet waste.

SUMMARY OF THE INVENTION

In view of the foregoing disadvantages inherent in the known types of waste catchers now present in the prior art, the present invention provides a new frame for catching pet waste construction wherein the same can be utilized for holding a bag for catching pet waste.

The general purpose of the present invention, which will be described subsequently in greater detail, is to provide a new frame for catching pet waste apparatus and method which has many of the advantages of the waste catchers mentioned heretofore and many novel features that result in a new frame for catching pet waste which is not anticipated, rendered obvious, suggested, or even implied by any of the prior art waste catchers, either alone or in any combination thereof.

To attain this, the present invention generally comprises a first tubular member that is elongate and has a first end and a second end. A second tubular member having a generally circular shape. The second end of the first tubular member is fluidly coupled to the second tubular member. Each of a plurality of clamps comprises an upper jaw and a lower jaw hingedly coupled together. Each of the lower jaws is integrally coupled to the second tubular member. Each of a plurality of biasing members biases each of the upper jaws toward a respective one of the lower jaws.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new frame for catching pet waste apparatus and method which has many of the advantages of the waste catchers mentioned heretofore and many novel features that result in a new frame for catching pet waste which is not anticipated, rendered obvious, suggested, or even implied by any of the prior art waste catchers, either alone or in any combination thereof.

It is another object of the present invention to provide a new frame for catching pet waste which may be easily and efficiently manufactured and marketed.

It is a further object of the present invention to provide a new frame for catching pet waste which is of a durable and reliable construction.

An even further object of the present invention is to provide a new frame for catching pet waste which is susceptible of a low cost of manufacture with regard to both materials and labor, and which accordingly is then susceptible of low prices of sale to the consuming public, thereby making such frame for catching pet waste economically available to the buying public.

Still yet another object of the present invention is to provide a new frame for catching pet waste which provides in the apparatuses and methods of the prior art some of the advantages thereof, while simultaneously overcoming some of the disadvantages normally associated therewith.

Still another object of the present invention is to provide a new frame for catching pet waste for holding a bag for catching pet waste.

Yet another object of the present invention is to provide a new frame for catching pet waste which includes a first tubular member that is elongate and has a first end and a second end. A second tubular member having a generally circular shape. The second end of the first tubular member is fluidly coupled to the second tubular member. Each of a plurality of clamps comprises an upper jaw and a lower jaw hingedly coupled together. Each of the lower jaws is integrally coupled to the second tubular member. Each of a plurality of biasing members biases each of the upper jaws toward a respective one of the lower jaws.

Still yet another object of the present invention is to provide a new frame for catching pet waste that has an actuator thereon for releasing a bag without having to touch the bag.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross-sectional view taken along line 3—3 of the present invention.

DESCRIPTION OF THE PREFERRED EMBODIMENT

Figure 1:
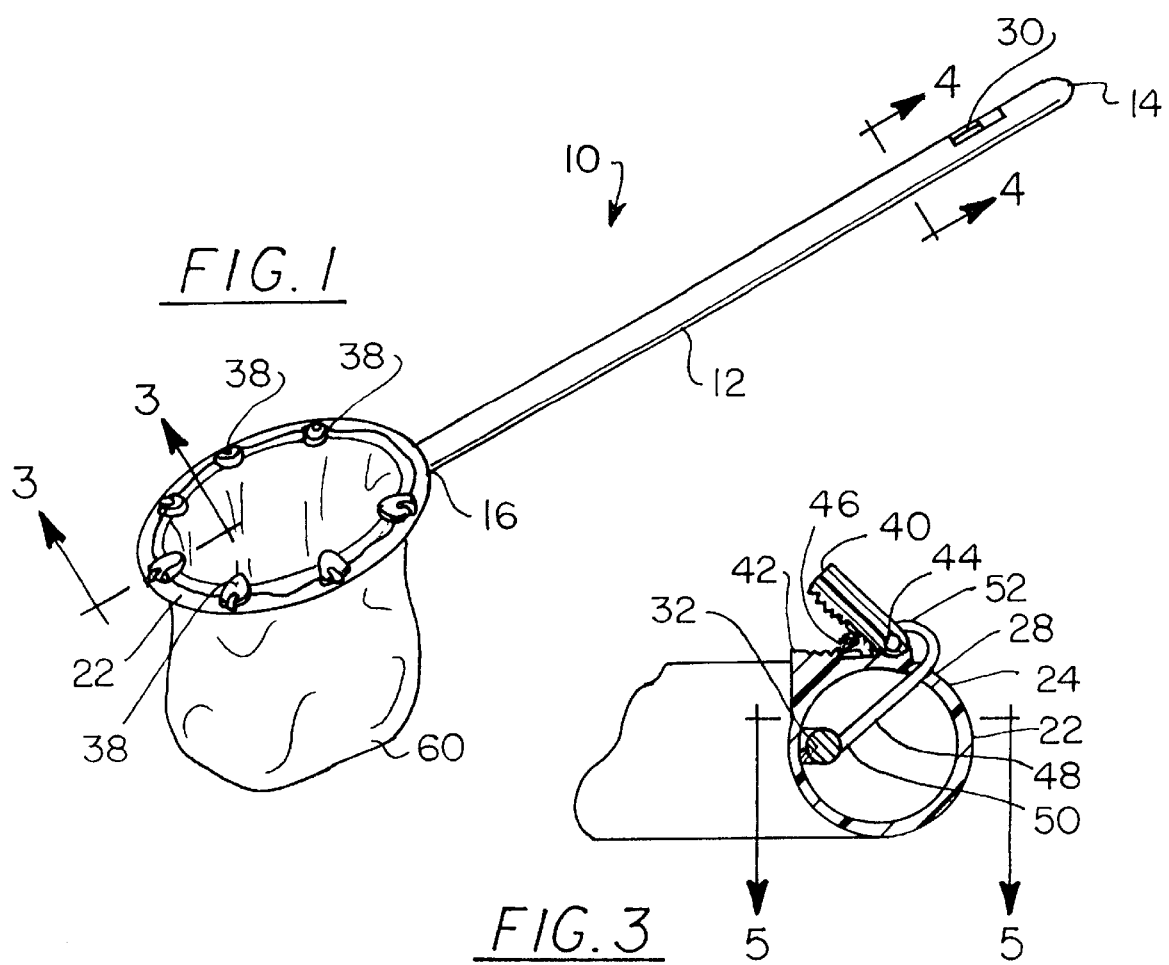
FIG. 1 is a schematic perspective view of a new frame for catching pet waste according to the present invention.
Figure 2:
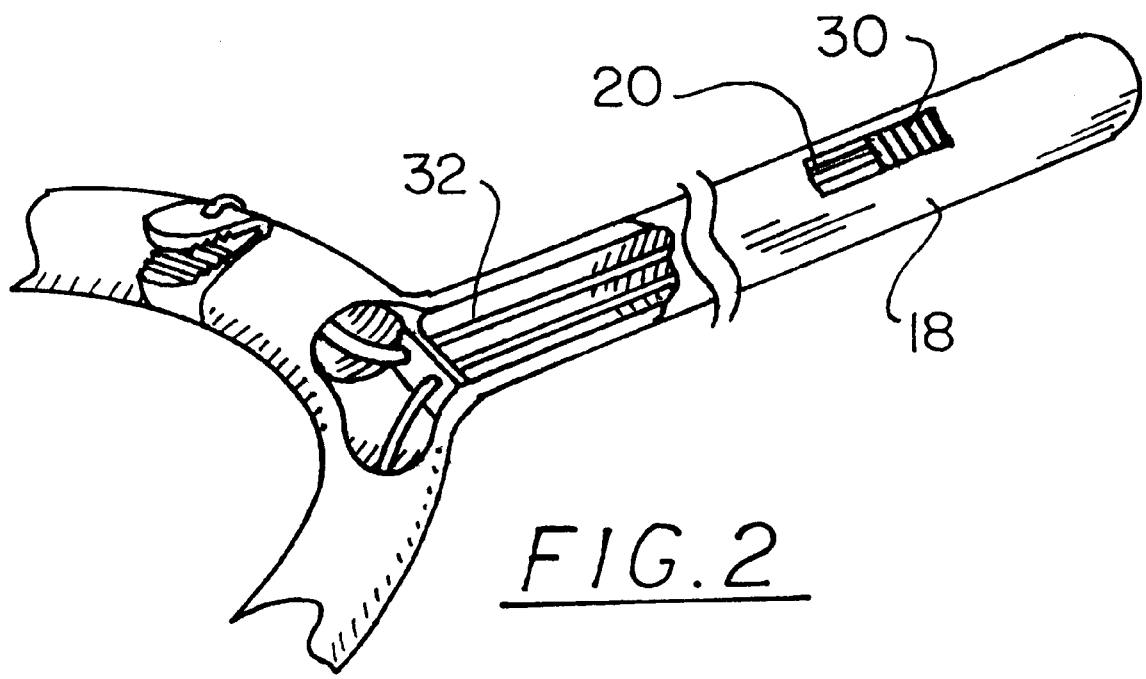
FIG. 2 is a schematic perspective broken view of the present invention.
Figure 4:
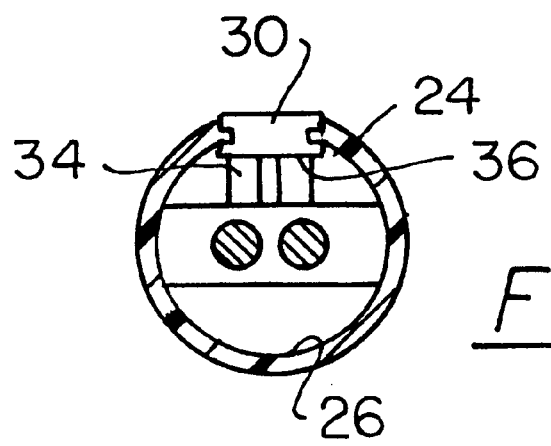
FIG. 4 is a schematic cross-sectional view taken along line 4—4 of the present invention.
Figure 5:
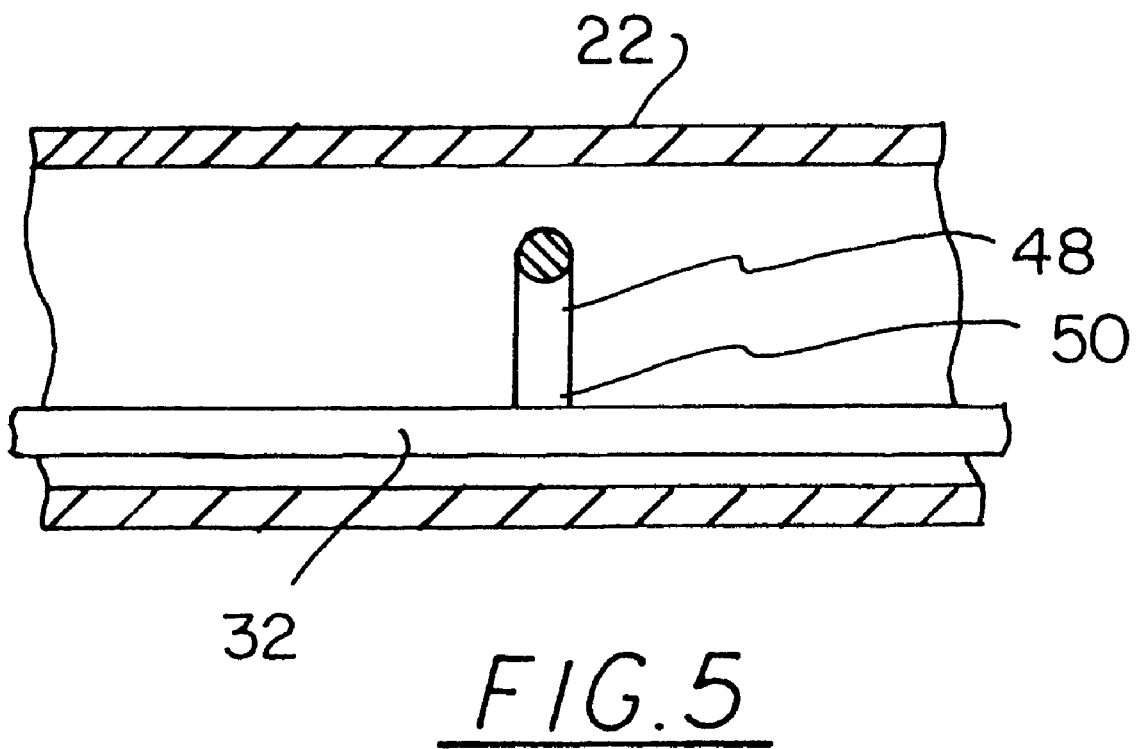
FIG. 5 is a schematic cross-sectional view taken along line 5—5 of the present invention.

With reference now to the drawings, and in particular to FIGS. 1 through 5 thereof, a new frame for catching pet waste embodying the principles and concepts of the present invention and generally designated by the reference numeral 10 will be described.

As best illustrated in FIGS. 1 through 5, the frame for catching pet waste 10 generally comprises a first tubular member 12. The first tubular member 12 is elongate and has a first end 14 and a second end 16. The tubular member 12 has a peripheral wall 18 having an aperture 20 therein. The aperture 20 is positioned generally adjacent to the first end 14.

A second tubular member 22 has a generally circular shape such that a pair of ends of the tubular member are fluidly coupled together. The second tubular member 22 has an outer surface 24 and an inner surface 26. The second tubular member 22 has a plurality of openings 28 therein. Each of the openings 28 is spaced from each other. The second end 16 of the first tubular member 12 is fluidly coupled to the second tubular member 22.

An actuator 30 is slidably positioned in the aperture 20 in the first tubular member 12.

A cord 32 is elongated and has a first end 34 and a second end 36. The first 34 and second 36 ends of the cord 32 are securably attached to the actuator 30. The cord 32 extends through the first 12 and second 22 tubular members. The cord 32 is ideally flexibly elastic.

Each of a plurality of clamps 38 comprises an upper jaw 40 and a lower jaw 42 hingedly coupled together by a hinge 44. Each of the lower jaws 42 is integrally coupled to the second tubular member 22. Each of the clamps 38 is positioned adjacent to one of the openings 28 in the second tubular member 22 such that the hinges 44 of the clamps 38 are positioned adjacent to a respective opening 28.

A plurality of biasing members 46 bias each of the upper jaws 40 toward a respective one of the lower jaws 42. Each of the biasing members 46 is securely attached to one of the jaws and extends between inner surfaces of the inner and lower jaws. Each of the biasing members 46 preferably comprises a spring.

Each of a plurality of filaments 48 has a first end 50 securely attached to the cord 32. Each of the filaments 48 is positioned generally adjacent to one of the openings 28 and extends through an adjacent opening 28. Each of the filaments 48 has a second end 52 securely attached to an outer surface of a respectively adjacent upper jaw 40.

In use, actuating the actuator 30 pulls the cord 32. The cord 32 in turn pulls the filaments 48 such that the upper jaws 40 are urged away from the bottom jaws 42 into an open position. The edge of a bag 60 is positioned between the upper 40 and lower 42 jaws and the actuator 30 released so that the jaws 40, 42 close together and grip the bag 60. When pet waste is caught in the bag 60, the bag 60 is removed and replaced.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A waste receiving frame for removably holding a bag for receiving pet waste comprising:

a first tubular member being elongate and having a first end and a second end;

a second tubular member having a generally circular shape such that said second tubular member forms a ring;

wherein said second end of said first tubular member is fluidly coupled to said second tubular member;

a plurality of clamps, each of said clamps comprising an upper jaw and a lower jaw hingedly coupled together by a hinge, each of said lower jaws being integrally coupled to said second tubular member;

a plurality of biasing members for biasing each of said upper jaws toward a respective one of said lower jaws.

2. The waste receiving frame as in claim 1, further including:
- said first tubular member having a peripheral wall having an aperture therein, said aperture being positioned generally adjacent to said first end;
- said second tubular member having a plurality of openings therein, each of said openings being spaced from each other;
- an actuator being slidably positioned in said aperture in said first tubular member;
- a cord being elongated and having a first end and a second end, said first and second ends of said cord being securably attached to said actuator, said cord extending through said first and second tubular member;
- each of said clamps being positioned adjacent to one of said openings in said second tubular member such that the hinges of said clamps are positioned adjacent to a respective opening;
- a plurality of filaments, each of said filaments having a first end securely attached to said cord, each of said filaments being positioned generally adjacent to one of said openings and extending through an adjacent opening, each of said filaments having a second end securely attached to an outer surface of a respectively adjacent upper jaw.

3. The waste receiving frame as in claim 1, wherein each of said biasing members comprises a spring.

4. The waste receiving frame as in claim 1, further including:
- an actuator being slidably positioned on said first tubular member;
- a cord extending through said first and second tubular members, said cord being mechanically coupled to said actuators and to each of said upper jaws, wherein movement of said actuator in a first direction urges said upper jaws away from said lower jaws.

5. The waste receiving frame as in claim 1, further including:
- said first tubular member having a peripheral wall having an aperture therein;
- said second tubular member having a plurality of openings therein;
- wherein said second end of said first tubular member is fluidly coupled to said second tubular member;
- an actuator being slidably positioned in said aperture in said first tubular member;
- a cord being elongated and having a first end and a second end each being securably attached to said actuator, said cord extending through said first and second tubular member;
- a plurality of filaments, each of said filaments having a first end securely attached to said cord, each of said filaments being extending through one of said openings in said second tubular member, each of said filaments having a second end securely attached to an outer surface of a respectively adjacent upper jaw.

6. The waste receiving frame as in claim 5, wherein each of said clamps is positioned generally adjacent to one of said openings in said second tubular member.

7. A waste receiving frame for removably holding a bag for receiving pet waste comprising:
- a first tubular member being elongate and having a first end and a second end, said tubular member having a peripheral wall having an aperture therein, said aperture being positioned generally adjacent to said first end;
- a second tubular member having a generally circular shape such that a pair of ends of said tubular member are fluidly coupled together, said second tubular member having an outer surface and an inner surface, said second tubular member having a plurality of openings therein, each of said openings being spaced from each other;
- wherein said second end of said first tubular member is fluidly coupled to said second tubular member;
- an actuator being slidably positioned in said aperture in said first tubular member;
- a cord being elongated and having a first end and a second end, said first and second ends of said cord being securably attached to said actuator, said cord extending through said first and second tubular member, said cord being flexibly elastic;
- a plurality of clamps, each of said clamps comprising an upper jaw and a lower jaw hingedly coupled together by a hinge, each of said lower jaws being integrally coupled to said second tubular member, each of said clamps being positioned adjacent to one of said openings in said second tubular member such that the hinges of said clamps are positioned adjacent to a respective opening;
- a plurality of biasing members for biasing each of said upper jaws toward a respective one of said lower jaws, each of said biasing members being securely attached to one of said jaws and extending between inner surfaces of said inner and lower jaws, each of said biasing members comprising a spring;
- a plurality of filaments, each of said filaments having a first end securely attached to said cord, each of said filaments being positioned generally adjacent to one of said openings and extending through an adjacent opening, each of said filaments having a second end securely attached to an outer surface of a respectively adjacent upper jaw; and
- wherein actuating said actuator pulls said cord, wherein said cord pulls said filaments such that said upper jaws are urged away from said bottom jaws into an open position, wherein the bag may be positioned between said upper and lower jaws.

8. A waste receiving frame for removably holding a bag for receiving pet waste comprising:
- a first tubular member being elongate and having a first end and a second end;
- a second tubular member having a generally circular shape such that said second tubular member forms a ring;
- wherein said second end of said first tubular member is fluidly coupled to said second tubular member;
- a plurality of clamps, each of said clamps comprising an upper jaw and a lower jaw hingedly coupled together by a hinge, each of said lower jaws being integrally coupled to said second tubular member;
- a plurality of biasing members for biasing each of said upper jaws toward a respective one of said lower jaws; and
- means for simultaneously opening each of said clamps.

* * * * *